Aug. 20, 1968    R. C. WICKLUND    3,397,750
ICE TRIMMING DEVICE
Filed Dec. 13, 1965    2 Sheets-Sheet 2
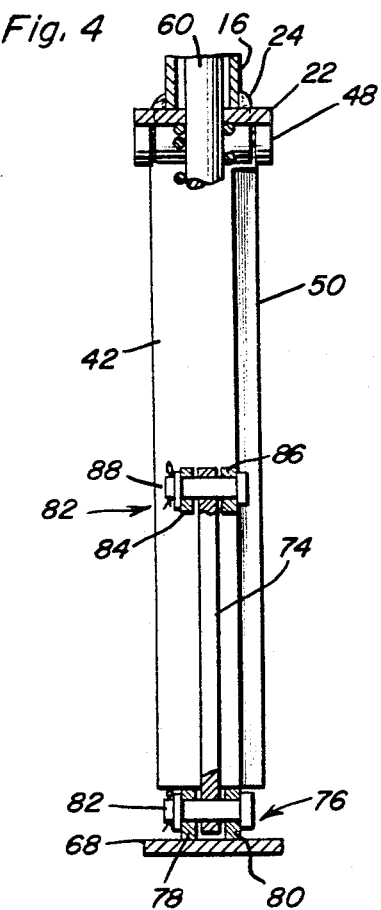
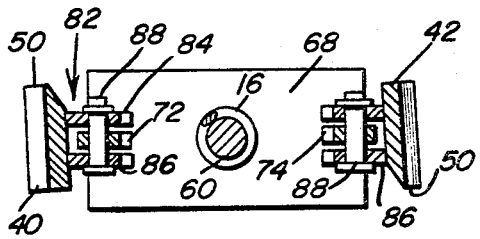
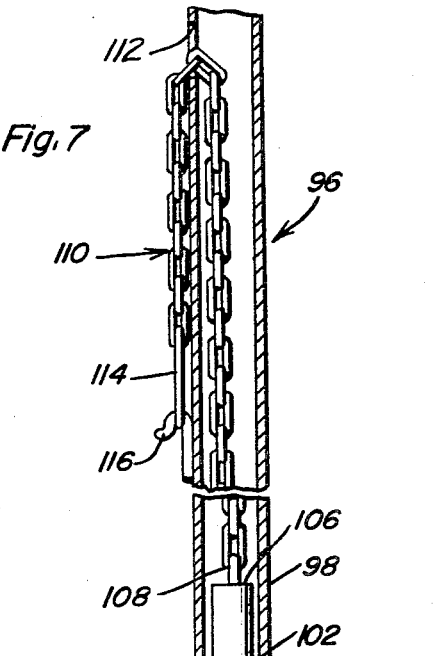
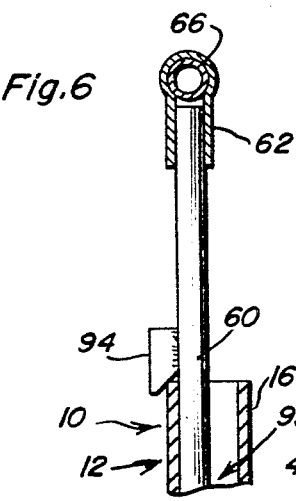
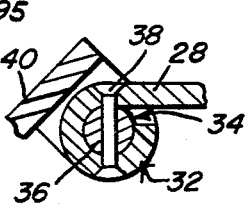
Roy C. Wicklund
INVENTOR.
BY Clarence A. O'Brien
and Harvey B. Jackson
Attorneys

United States Patent Office 3,397,750
Patented Aug. 20, 1968

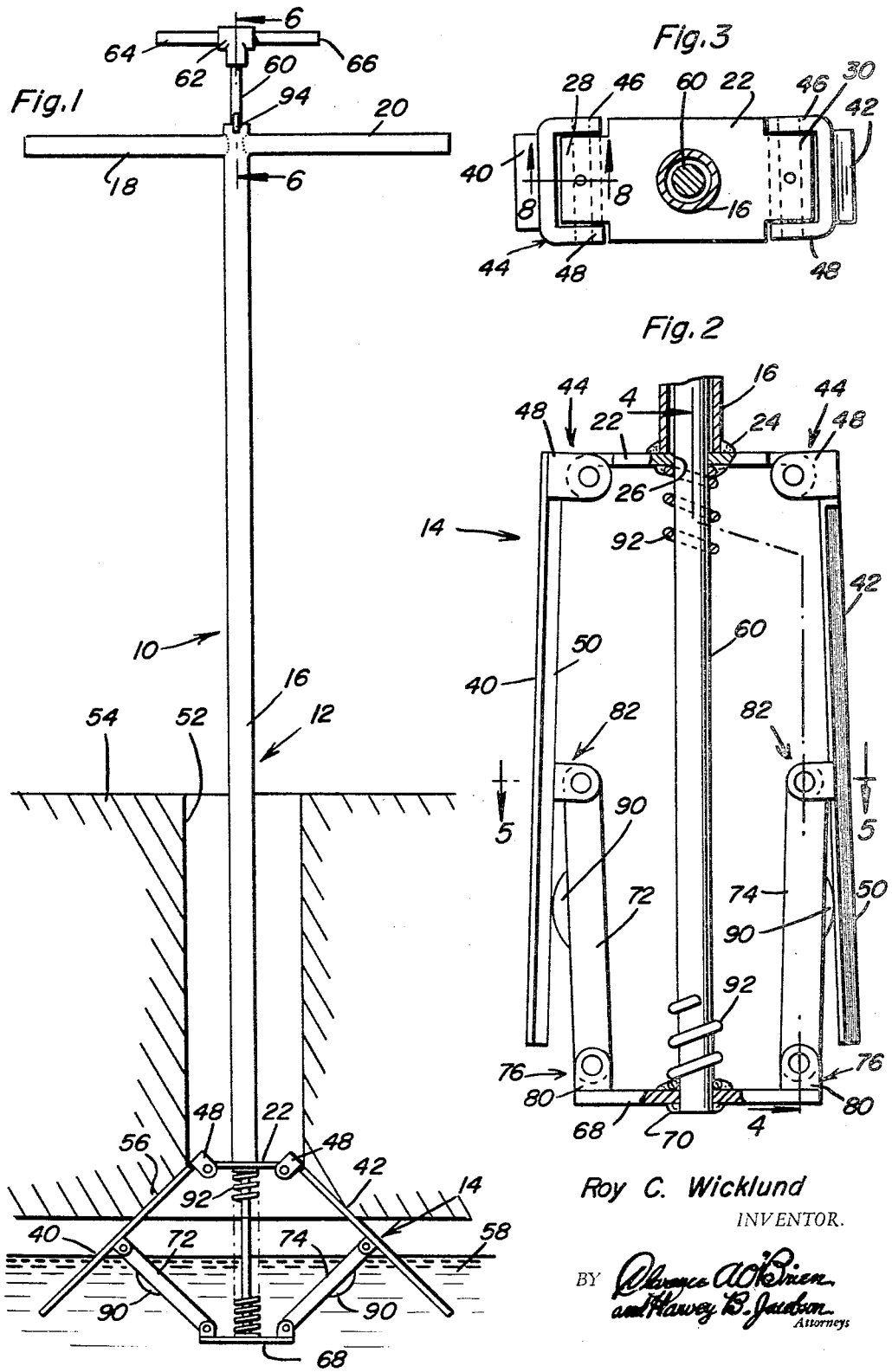

3,397,750
ICE TRIMMING DEVICE
Roy C. Wicklund, Boxholder 2,
Alexandria, Minn. 56308
Filed Dec. 13, 1965, Ser. No. 513,264
5 Claims. (Cl. 175—18)

ABSTRACT OF THE DISCLOSURE

A device for chamfering the lower end of an ice hole comprising an elongated tubular body having pivotally mounted blades at the lower end thereof, and an actuator bar extending through said body and operatively engaged with said blades for effecting an extension of the blades upon the introduction of the lower end of the tubular body through an ice hole. The extended blades, upon a rotation of the tubular body, chamfer the bottom of the ice hole and are subsequently, through a movement of the actuator bar, collapsed for withdrawal through the ice hole.

This invention relates generally to ice cutting devices and more specifically to an ice trimming device useful for trimming the lower edge of an ice hole in order to taper or chamfer the edge of the hole for relieving the sharp edge left after the hole is cut by an ice auger.

Briefly, this invention comprises two embodiments of ice trimming devices for chamfering the lower end of a precut ice fishing hole whereby the sharp hidden lower edge of the hole will be eliminated and fish may be easily drawn upwardly through the hole. Each embodiment of the device includes a pair of swingably mounted blades at the lower end of a hollow elongate supporting member, and a spring-biased actuator bar slidably mounted in the supporting member and operatively connected to the blades for moving the blades into and out of cutting position.

It is an object of the present invention to provide two embodiments of a device for chamfering the blind side edge of an ice hole.

It is another object of the present invention to provide two embodiments of an ice trimming device, each including a cutting tool which may be folded to fit through a relatively small hole in the ice and then expanded to chamfer the hidden edge of the hole.

It is a further object of the present invention to provide ice trimming devices of the character described which may be easily and inexpensively constructed of readily available materials and which is extremely rugged in construction.

It is a still further object of the present invention to provide two embodiments of ice chamfering devices in accordance with the present invention, both of which include manually controllable cutting blades thereon and one of which provides for power rotation of the cutting blade, or blades.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a first embodiment of ice trimming tool comprising the present invention;

FIGURE 2 is an enlarged detail view of the cutting head portion of the trimming tool illustrated in FIGURE 1;

FIGURE 3 is a top plan view corresponding to FIGURE 2;

FIGURE 4 is a vertical sectional view taken substantially on the plane of the line 4—4 of FIGURE 2;

FIGURE 5 is a horizontal sectional view taken substantially on the plane of the line 5—5 of FIGURE 2;

FIGURE 6 is an enlarged vertical sectional view taken substantially on the plane of the line 6—6 of FIGURE 1;

FIGURE 7 is a vertical sectional view of a second preferred embodiment of the trimming tool comprising the present invention; and FIGURE 8 is an enlarged sectional view taken substantially on the plane of the line 8—8 of FIGURE 3.

Referring now to the drawings in more detail, and specifically to FIGURES 1–6 and 8, reference numeral 10 generally denotes the ice trimming device comprising a first embodiment of the present invention. The ice trimming device 10 includes a body member generally denoted by reference numeral 12 and a cutting head generally denoted by reference numeral 14 mounted at the lower end of the body member 12. The body member 12 is an elongated hollow cylindrical member 16 which is preferably constructed of a metallic material such as iron or the like and is thus extremely rigid and resistant to wear. Mounted at the upper end of the cylindrical member 16 are the cross handles 18 and 20 which are suitably fastened thereto, as for example by welding or the like, and which further may have rubber handle grips thereon to facilitate the gripping thereof.

Referring now to FIGURES 2 and 3 in particular, it will be seen that a plate-like member 22 is mounted, as by the welds 24, to the bottom end of the tubular member 16, the plate-like member 22 extending at a right angle to the longitudinal axis of tubular member 16. Further, the plate-like member 22 includes an opening 26 therein of somewhat lesser diameter than the inner diameter of the tubular member 16, the opening 26 being substantially coaxial with the tubular member 16. The plate-like member 22 includes hinge-like end portions 28 and 30 which, by viewing FIGURE 8, will be seen as curving downwardly as indicated at 32 to form a chamber 34 therein, for reception of a pin member 36. The pin member 36 is retained in the hinge members 28 and 30 by a retaining pin 38.

The cutting head 14 includes a pair of cutting blades 40 and 42 thereon, the blades 40 and 42 being mounted on the hinge members 28 and 30, respectively, by identical bracket members 44. The bracket members 44 each includes a pair of legs 46 and 48 having apertures therein in which the pins 36 may be received whereby the blades 40 and 42 are disposed on opposite sides of the body member 12 and rotatable on the hinge members 28 and 30. It will be appreciated that the blades 40 and 42 may be releasably mounted on these aforementioned hinge members as by cotter pins or the like, whereby the blades will comprise quick release blades. Further, referring to FIGURES 2 and 3 again as well as to FIGURE 5, it will be observed that the leg 48 of the left hand bracket in FIGURE 3 is longer than the leg 46, while the leg 46 of the right hand bracket is longer than the leg 48. Thus, the blades 40 and 42 will be tilted at a slight angle with respect to both the side edges of hinge portions 28 and 30 and the longitudinal axis of the tubular member 16 so that the sharpened edges 50 of the blades 40 and 42 are tilted whereby they will present a leading cutting edge when the trimming device 10 is rotated clockwise about the longitudinal center axis of the tubular member 16. The preferred degree of tilt imparted to the blades 40 and 42 is between two and sixteen degrees, as it has been determined that a tilt thereof in this range will provide sufficient bite for the blades 40 and 42 when used in their intended manner. Thus, by referring to FIGURE 1 in particular, it will be observed that the device 10 may be positioned through a precut bore 52 in the ice 54 whereby the blades 40 and 42 may be expanded and the device rotated in order to cut a chamfer 56 in the bottom edge of the ice around the bore 52. This will then allow fish to be easily drawn upwardly through the bore 52 from the water 58 below the ice 54 after being caught.

The blades 40 and 42 of the cutting head 14 are normally retained in the position illustrated in FIGURES 2 and 3 by biasing means including an actuator bar 60 which is a solid cylindrical bar of greater length than the tubular member 16, which extends through the opening 26 in the plate-like member 22 and upwardly through the tubular member 16. A T-connector 62 is mounted on the upper end of the bar 60 and a pair of handles 64 and 66 are provided in the connector 62 whereby the actuator bar 90 may be moved longitudinally through the tubular member 16 by use of the handles. The cutting head 14 includes a crosshead member 68 fastened to the bottom end of the actuator bar 60, as for example by welds 70, the crosshead member 68 being substantially identical in size to the plate-like member 22, each being substantially rectangular. A pair of actuator arms 72 and 74 are each pivotally connected to one end of the crosshead member 68 by the hinge connections generally denoted by reference numeral 76. The hinge connections 76 each includes a pair of upstanding leg members 78 and 80 on the crosshead member 68 through which a pin 82 is mounted to rotatably retain the arms 72 and 74 therebetween. The arms 72 and 74 are rotatably connected to the blades 40 and 42 respectively by the hinge connections generally denoted by reference numeral 82, the hinge connections 82 being substantially identical to the hinge connection 76. Thus, by referring to FIGURE 4, it will be observed that the hinge connections 82 include spaced parallel outstanding leg members 84 and 86 on the blades 40 and 42 between which the arms 72 and 74 are rotatably retained by the pins 88. The arms 72 and 74 each includes an abutment member 90 on the outer edges thereof which, by referring to FIGURE 2 will be observed to limit the inward movement of the blades 40 and 42. Thus, the blades 40 and 42 when folded to an inoperative position as illustrated in FIGURES 2 and 3 will not be permitted to move inwardly so as to be parallel with the longitudinal axes of tubular member 16 and actuator bar 60, but will be at a slight angle thereto. Thus, when the actuator bar 60 is moved upwardly through the tubular member 16, the blades 40 and 42 may be easily moved outwardly to the position illustrated in FIGURE 1, whereby if the abutment members 90 were not included, it would be quite difficult to so move the blades.

Coiled about the actuator bar 60 and retained between the plate-like member 22 and crosshead member 68 is a compression coil spring 92 which will normally act to bias the cutting head 14 to the folded or inoperative position illustrated in FIGURES 2 and 3. When the cutting head 14 is in this folded position, the lower end of the trimming device 10 may be moved downwardly through the bore 52. At this time, the actuator bar 60 may be moved upwardly through the hollow tubular member 16 against the biasing force of spring 92 by grasping the handles 64 and 66 thereof and pulling upwardly thereon. A hook-like member 94 is provided on the actuator bar 60 adjacent the upper end thereof, and inasmuch as the bar 60 is of somewhat smaller outer diameter than the inner diameter of tubular member 16, when the bar 60 is pulled upwardly through the tubular member 16 in order to activate or unfold the blades 40 and 42 of the cutting head 14, the bar 60 may be moved radially in the tubular member 16 until the hook-like member 94 is hooked over the upper end of the tubular member, in order to retain the cutting head 14 in unfolded or cutting position against the bias force of spring 92. Thus, it will be apparent that after the lower end of the trimming device 10 is moved downwardly through the bore 52, the cutting head 14 may be unfolded and retained in unfolded position as described above and the hidden lower edge of the bore 52 chamfered as illustrated in FIGURE 1 by turning the cutting head 14 by the use of the handles 18 and 20. It will now be apparent why the blades 40 and 42 are preferably tilted outwardly as described above; that is, so that in operation the cutting edge of the blades will bite into the ice thereby trimming off the ice as the device 10 is rotated. It will be appreciated further that the cutting edges 50 of the blades 40 and 42 are preferably tempered to provide an efficient cutting edge thereon, and as well it will be appreciated that one of the cutting edges could be smooth while the other is serrated or one blade may have a cutting edge thereon while the other edge has an unsharpened edge whereby the unsharpened blade will operate as a stabilizer or idler arm with the other sharpened blade doing the cutting. Further, the chamber 95 provided within the hollow tubular member 16 will normally be filled with a suitable jelly-like lubrication material having a freezing point substantially lower than the freezing point of water in order to insure that water will not enter the tubular member 16 and freeze and thereby interfere with the operation of the device. It will also be desirable to provide a smooth and polished outer surface on the activator bar shaft 60 to further facilitate the longitudinal movement of the bar in the chamber 95.

Referring now to FIGURE 7, a second preferred embodiment of the present invention is generally denoted by reference numeral 96 and includes a hollow tubular member 98 substantially identical to the tubular member 16 described above, having a cutting head 100 identical to the cutting head 14 described above thereon. It will be observed that the cutting head 100 includes blades 40 and 42 thereon as well as the coil spring 92 and the various other components thereon. In this embodiment of the invention the actuator bar 60 is replaced by an actuator bar 102 which is substantially shorter than the tubular member 98, the bar 102 having a portion 104 which extends downwardly from the lower end of the tubular member 98 and about which the spring 92 is coiled. Attached to the upper end 106 of the bar 102 by the hook 108 is a flexible connecting means in the form of a chain 100. However, it will be apparent that any conventional flexible connector such as a steel cable or the like may be used in place of the chain 110. The tubular member 96 has an opening 112 therein preferably adjacent the upper end thereof through which the chain 110 extends. The chain 110 includes an enlarged mounting head 114 on the end thereof and there is mounted on the outer wall of the tubular member 98 a hook 116 on which the head 114 may be placed when the activator bar 102 is moved upwardly in the tubular member 98 to unfold or activate the cutting head 100. Further, it is anticipated that suitable power means, such as a small gasoline engine, battery powered generator (electric motor), or the like, may be used in conjunction with the tubular member 98 in order to rotatably drive the tubular member 96 and have the cutting head 100. Of course the chain 110 is manually operated in order to overcome the bias force of spring 92 and move the actuator bar 102 upwardly to unfold the head 100.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hole chamfering device comprising a body member, a cutting head at one end of said body member, said cutting head including blade means thereon, means on said body member for selectively folding and unfolding said cutting head, means for biasing said cutting head to a folded condition, and means for retaining said cutting head in unfolded condition against the biasing force of said biasing means, said blade means including at least one cutting blade pivotally mounted on one end of said body member, said folding means comprising an actuator bar slidably mounted in said body member, arm means, said blade pivotally connected to one end of said arm means, said actuator bar operatively connected to the other end of said arm means whereby sliding movement of said actuator bar relative to said body member will swing said blade about pivotal connection of said blade to said body member, said body member comprising a hollow tubular member, said actuator bar being of substantially shorter length than said tubular member, the lower end of said actuator bar extending outwardly of the lower end of said tubular member, flexible connecting means connected to the upper end of said actuator bar and extending upwardly through said tubular member, the operative connection between said actuator bar and said arm means being at the lower end of said actuator bar whereby said actuator bar may be moved by said flexible connecting means longitudinally of said tubular member for swingingly moving said blade.

2. The combination of claim 1 wherein said flexible connecting means extends outwardly of said tubular member, said retaining means comprising hook means formed on the outer wall of said tubular member, said flexible connecting means including means thereon adapted to be releasably connected to said hook means when said actuator bar is drawn upwardly through the tubular member against the force of said biasing means.

3. The combination of claim 1 wherein said blade means includes a second cutting blade pivotally mounted on opposite side of said tubular member from said one cutting blade, said actuator bar having a crosshead member at the lower end thereof outwardly of said tubular member, said crosshead member extending perpendicularly to the lonigtudinal axis of said actuator bar, said arm means being hingedly connected to one end of said crosshead member, and second arm means hingedly connected between the second of said blades and the other end of said crosshead member, and said biasing means comprising a coil spring mounted on the lower end of said actuator bar between said crosshead member and said tubular member.

4. The combination of claim 3 wherein said flexible connecting means extends outwardly of said tubular member, said retaining means comprising hook means formed on the outer wall of said tubular member, said flexible connecting means including means thereon adapted to be releasably connected to said hook means when said actuator bar is drawn upwardly through the tubular member against the force of said coil spring.

5. An ice trimming device for chamfering the lower end of an ice hole comprising a vertically elongated tubular body, means at the upper end of said body for effecting a controlled rotation of said body, an elongated actuator bar slidably mounted in said body and projecting beyond the lower end thereof, a crosshead fixed to the lower end of said actuator bar in spaced relation below the lower end of said tubular body, a plurality of cutting blades, means pivotally connecting one end of each blade to the lower end of said body for a swinging movement of the blades upward from a substantially vertical position paralleling said body, arm means extending between and pivotally secured to each blade in spaced relation to the pivotal engagement of the blade with the body and the outer end of the crosshead whereby upward movement of the actuator bar, and thereby the crosshead, will effect an outward swinging of the blades, spring means positioned about the actuator bar within said blades and engaged between the crosshead and the lower end of the body to resiliently resist upward movement of the crosshead and bias said blades into generally parallel relation with said body, means on said actuator bar for effecting an upward movement of said bar relative to said body, and means for retaining said actuator bar, and thereby the crosshead, in an upwardly moved position against the biasing force of the spring means, said means for effecting an upward movement of the actuator bar comprising a flexible member secured to the upper end of said actuator bar and extending upwardly and outwardly through the tubular body, said means for retaining the actuator bar in its upwardly moved position including retainer means fixed to the outer surface of said tubular body and means on said flexible member releasably engageable with said retainer means.

References Cited
UNITED STATES PATENTS

| | | | |
|---|---|---|---|
| 469,290 | 2/1892 | Whipple | 175—285 |
| 537,729 | 4/1895 | Smith | 175—285 |
| 554,492 | 2/1896 | Kenevel | 175—285 |
| 1,498,463 | 6/1924 | McCloskey et al. | 175—285 |
| 1,970,063 | 8/1934 | Steinman | 175—285 X |
| 2,194,706 | 3/1940 | Litter | 175—285 |
| 3,299,970 | 1/1967 | Anderson | 175—18 |

DAVID H. BROWN, *Primary Examiner.*